Nov. 13, 1956            H. BÖER            2,770,796
REGISTERING DEVICE FOR RECEIVING AND SENDING CONNECTING
ORDERS, PARTICULARLY FOR CONVEYING PLANTS
Filed Feb. 13, 1953            2 Sheets-Sheet 2

INVENTOR
HANS BOER

BY
ATTORNEY

United States Patent Office 2,770,796
Patented Nov. 13, 1956

2,770,796

REGISTERING DEVICE FOR RECEIVING AND SENDING CONNECTING ORDERS, PARTICULARLY FOR CONVEYING PLANTS

Hans Böer, Berlin-Steglitz, Germany, assignor to International Standard Electric Corporation, New York, N. Y., a corporation of Delaware Application February 13, 1953, Serial No. 336,851

Claims priority, application Germany February 23, 1952

7 Claims. (Cl. 340—174)

This invention relates to a device for recording and translating information.

In conveying plants, particularly letter-sorting plants and distributing devices for telegraphic messages, in which the items to be conveyed are conveyed from one point to other points of destination, a number of conveying means are provided, conveying the items to be conveyed from one distributing center to the different places of destination. In some conveying plants the number of conveying means required correspond to the number of destination points.

Where a great number of destination points must be catered to, individual conveying means become uneconomical and therefore, systems have been developed which provide a single conveying means with means to automatically eject conveyed material at predetermined points along the path of travel of the conveyor. Such a system entails apparatus which must be capable of storing information regarding the destination point of each article applied to the conveyor means which apparatus must be capable of operating switches, which switches control discharge apparatus, via which the item to be conveyed will reach its place of destination.

In conveying equipments of the latter kind special measures must be taken when delivering up the item to be conveyed, in order to be on the safe side and sure that only the switch of that particular receiving station will be actuated, for which the respective item has been destined.

The setting of the switch, however, may not be carried out at the same time with delivery to the conveying means of the item to be conveyed, but only at the moment the item arrives in front of the switch in question. If it were otherwise arranged, then it would be likely that other items, already lying on the conveyor belt but not destined to the same destination, would be falsely conducted by means of falling into the already opened switch. Hence there exists the necessity of registering the connecting order, which had been carried out at the place of delivery.

The registration is performed either mechanically, magnetically or electronically. The hitherto employed devices for registering were very expensive and partly, similar as in mechanical methods of registering, subject to a considerable wear and tear.

The present invention relates to a registering device which is simple in its construction and economical in operation. According to the invention this is achieved thereby, that register elements, which are magnetizable by means of electromagnets, are arranged in spaces on one or more carriers moving along in a closed path, which according to their magnetic condition act in the course of their movement upon magnetic devices which control groups of contacts, which are assembled in combinations in such a manner that certain identifying circuits will be closed.

Accordingly, contacts are directly actuated by means of magnetic forces, caused by the magnets which are used as registering elements, thereby in relation to conventional arrangements extensively reducing the expense of equipment required for reading the information stored in the register.

In order that the invention may be clearly understood, a description will be given of one of its embodiments, reference being made for this purpose to the accompanying drawings in which.

Figure 1:
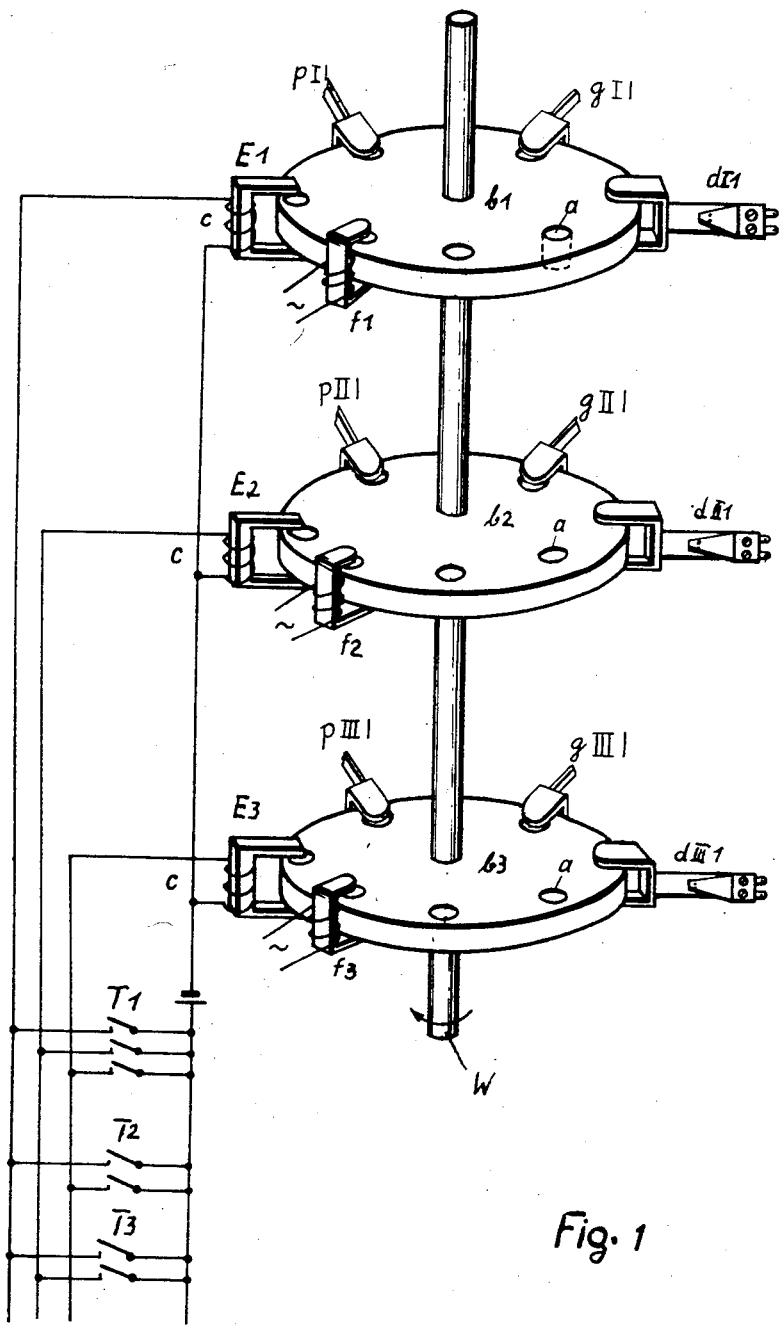
Fig. 1 is a perspective view of the mechanical components and a schematic view of the electrical components comprising the invention.

Referring now to Fig. 1 the illustrated object of the invention relates to a device for registering switch connecting orders of a conveying plant. Small cylindrical parts $a$ which are made of a magnetizable material are provided as registering elements and comprise a length of magnetizable material inlaid in a carrier disc $b1$ of nonmagnetic material, the elements $a$ equidistantly spaced and disposed in a circle concentric to and adjacent to the periphery of the disc $b1$, each element extending through the disc and having its respective magnetic poles on opposite sides of the disc. Several of such carriers $b1$, $b2$, $b3$ are spacedly mounted to a common shaft W1 for rotation in the direction of the arrow.. Further, each carrier is associated with an electromagnet E1, E2, E3, via which selectively one of the registering elements $a$ is magnetized. The electromagnets E1 . . . E3 are U-shaped, the arms of the U representing the pole pieces thereof, each arm extending over opposite surfaces of the discs $b1$ . . . $b3$ in magnetic linkage relation with opposite ends of elements $a$. The energizing of the electromagnets is carried out by means of the keys T1, T2, T3, respectively. If, as an example key T1 is depressed, then all of the three registering elements, arranged below the electromagnets, will be magnetized at the same time. When depressing key T3, for instance, only a magnetization of these registering elements is performed, which are just below the magnets E1 and E2.

Figure 1A:
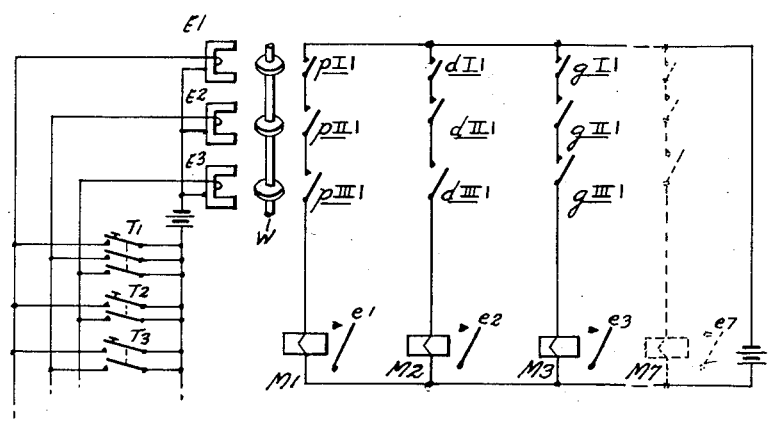
Fig. 1A is a schematic circuit diagram of groups of contacts controlled by the several carriers shown in Fig. 1.

Since the identification of the registering elements is carried out on a binary basis and will result in two possible conditions: magnetized or unmagnetized resulting in $2^n$ different possibilities of evaluation, of which, however, one form, i. e. "all magnets unmagnetized" cannot be evaluated. Hence $2^n-1$ different connecting orders are able to be registered. A corresponding number of switches may be provided in one conveying plant. In the exemplified embodiment there is $n=3$. Accordingly the number of possible connecting operations is $2^3-1=7$. In the course of the rotary movement of the carriers $b1$, $b2$, $b3$ the registering elements $a$ pass a number of groups of receiving contacts, $d$II1, $g$II1, $p$II1; $d$III1, $g$III1, $p$III1; and $d$IIII1, $g$IIII1, $p$IIII1, each group being associated with a different one of the carriers $b1$, $b2$ and $b3$. The contacts of each group are arranged equidistantly around the respective carriers and corresponding contacts of each group are interconnected as shown in Fig. 1A in certain combinations.

Figure 2:
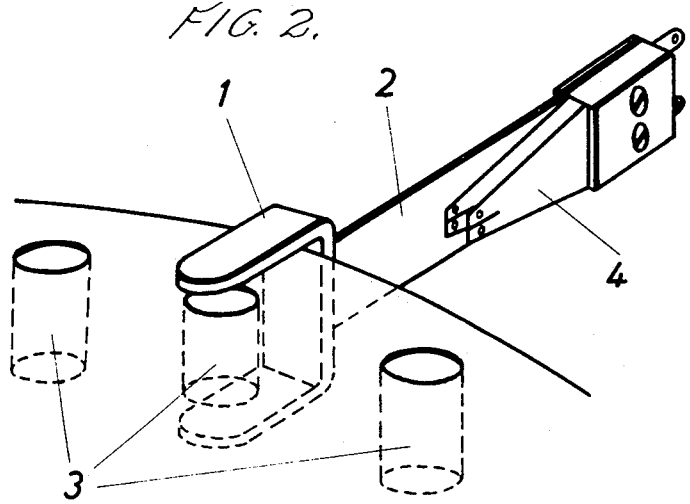
Fig. 2 is a view in perspective of a portion of Fig. 1.

A type model of these contacts is shown in Fig. 2 of the accompanying drawing. To the end of an operating spring 2 a yoke 1 of soft iron is mounted. The yoke is engaged and driven along by a passing magnetized registering element 3. The operating spring 2 will be thereby removed from its rest position and acts upon a set of springs 4 which are designed as make or break contacts. In Fig. 1A, contacts $d$II1 and $g$IIII1 are back contacts which will open when their associated yokes 1 are driven by magnetized elements 3. Since there is no physical contact between the registering element 3 and the yoke 1, the movement of yoke 1 is continued until the spring tension of the operating spring 2 becomes greater than the power of attraction of the magnet.

Each time three superposed sets of contact springs for example, *d*I1, *d*II1, *d*III1 (Fig. 1A), form one chain of contacts via which the connecting order for one switch magnet is performed. This function is illustrated in Fig. 1A. In case the registering element, located below the set of contacts *d*I1 and *d*III1, has been magnetized, then these two corresponding contacts will be made. Assume that key T2 has been depressed and as a result the following electric circuit for the switch magnet M2 will be minus, *d*III1, *d*II1, *d*I1, M2 plus Break contacts *d*III1 remain in the rest position since electromagnet E2 was not included in the energizing circuit completed by key T2.

The drive for the carriers of the registering elements is performed either mechanically by way of the conveying means or is furnished with a driving shaft of its own and which, by the employment of special devices is synchronized to the speed of the conveying means in such a manner that the times required for covering the sections between the receiving contacts coincide with the times required for covering the sections of the means of conveying, i. e. with the spacings of the switches. For reason of simplicity keys are shown in Figs. 1 and 1A for the setting of the connecting orders. It is of advantage if the key contacts can be replaced by relay contacts. Under such conditions the possibility exists for controlling this relay via a cam contact (not shown) that is arranged at the shaft W, so that the moment for the manual setting may be chosen at will without having to consider the momentary position of the registering magnets.

Furthermore an erasing device *f*1, *f*2, *f*3 is provided by means of which the registering elements are de-magnetized prior to each new magnetization. These erasing devices may be continuously supplied preferably with alternating current and are disposed in similar position to the recording electromagnets by being spaced therefrom between the last contact groups, for example, *d*I3 associated with the disc *b*1 and the recording electromagnet E1. The placement of the erasure magnets is determined by the direction of rotation of the shaft W1.

The registering device outlined in this specification operates in a centralized manner. However, it is also possible to arrange the registering elements directly on the moving means of conveying, for instance, on the moving tape, in such a manner that a group of registering elements is arranged next to each other, viz. is arranged on the tape vertically to the direction of conveyance. At spaced intervals along the tape, groups of receiving contacts are provided these intervals coinciding with the discharge points and which are operated according to the condition of the registering elements. If this condition of the registering elements is adapted to a particular discharge point, then a circuit will be completed for the respective switch magnet. The de-centralized controlling device has the advantage, in comparison with the centralized one, that no synchronizing equipment is required.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A register comprising a plurality of input circuits, means for energizing said input circuits in different code combinations, a plurality of output circuits, a plurality of movable carrier means, a plurality of groups of magnetic register elements, each of said groups mounted on a different one of said carrier means, each element of a group spaced from the other, single means coupling said carrier means for movement in tandem, a plurality of magnetic recording devices, each coupled to a different one of said input circuits and adapted to be controlled thereby, fixedly mounted with respect to and in proximity of a first portion of a different one of said carrier means, said recording devices adapted to selectively alter the magnetic characteristics of selected of the elements in said groups in response to said code combinations, a plurality of movable, magnetic receiving devices, each in proximity with different portions of said carrier means, separate switch means, each coupled to a different one of said output circuits, each of said switch means under control of a different one of said magnetic receiving devices.

2. A register as claimed in claim 1 wherein each of said carrier means comprises a disc of non-magnetic material.

3. A register as claimed in claim 1 wherein each of said magnetic elements comprises a length of magnetizable material, said material lengths equidistantly spaced and disposed in a circle concentric to and adjacent to the periphery of said disc, said material lengths extending through said disc and having their respective magnetic poles on opposite sides of said disc.

4. A register as claimed in claim 3, wherein each of said magnetic receiving devices comprises a Y-shaped structure, the arms of said element in proximity to opposite surfaces of said disc and in magnetic linkage relation with opposite ends of said material lengths, the leg of said structure being resilient and secured at its free end to a fixed point radially outward of said disc.

5. A register as claimed in claim 4, wherein said switch means comprises cooperating contact pairs in operative relation with said leg.

6. A register as claimed in claim 5 further comprising a plurality of means for erasing a magnetic charge in any of said elements, each of said erasing means operably associated with and fixedly positioned with respect to said disc intermediate said recording device and an adjacent receiving device.

7. A register as claimed in claim 6 wherein each of said magnetic recording devices comprises an U-shaped electromagnet having its arms extending over opposite surfaces of said disc and in magnetic linkage relation with opposite ends of said material lengths.

References Cited in the file of this patent

UNITED STATES PATENTS

| | | |
|---|---|---|
| 2,303,918 | Dimond | Dec. 1, 1942 |
| 2,543,014 | Grace | Feb. 27, 1951 |
| 2,553,629 | Behr | May 22, 1951 |
| 2,564,403 | May | Aug. 14, 1951 |
| 2,609,143 | Stibitz | Sept. 2, 1952 |